US012548512B2

(12) United States Patent
Kim et al.

(10) Patent No.: US 12,548,512 B2
(45) Date of Patent: Feb. 10, 2026

(54) DISPLAY DEVICE

(71) Applicant: Samsung Display Co., LTD., Yongin-si (KR)

(72) Inventors: Dong Woo Kim, Yongin-si (KR); Kyung Bae Kim, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/768,472

(22) Filed: Jul. 10, 2024

(65) Prior Publication Data

US 2025/0124867 A1 Apr. 17, 2025

(30) Foreign Application Priority Data

Oct. 16, 2023 (KR) ........................ 10-2023-0137875

(51) Int. Cl.
*G09G 3/3233* (2016.01)

(52) U.S. Cl.
CPC ... *G09G 3/3233* (2013.01); *G09G 2300/0465* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC ......... G09G 3/3233; G09G 2300/0465; G09G 2300/0819; G09G 2300/0852; G09G 2300/0861; G09G 2310/08; G09G 2320/0233
USPC .......................................................... 345/204
See application file for complete search history.

(56) References Cited

U.S. PATENT DOCUMENTS

| | | | | |
|---|---|---|---|---|
| 8,553,018 | B2 | 10/2013 | Nathan et al. | |
| 9,236,011 | B2 | 1/2016 | Mizukoshi | |
| 9,460,662 | B2 | 10/2016 | Lee et al. | |
| 2016/0284267 | A1* | 9/2016 | Gil | H10K 59/1216 |
| 2019/0340969 | A1* | 11/2019 | Hu | G11C 19/287 |
| 2021/0201761 | A1* | 7/2021 | Yin | G09G 3/32 |
| 2021/0233968 | A1* | 7/2021 | Yang | H10K 59/353 |
| 2021/0327362 | A1* | 10/2021 | Park | H10K 59/123 |
| 2022/0320196 | A1* | 10/2022 | He | H10K 59/1216 |
| 2022/0383813 | A1* | 12/2022 | Wang | G09G 3/3266 |
| 2023/0107029 | A1* | 4/2023 | Wang | G09G 3/3266 345/206 |
| 2023/0142681 | A1* | 5/2023 | Cho | G06F 3/0412 345/174 |
| 2024/0054953 | A1* | 2/2024 | Jeong | G09G 3/3233 |
| 2024/0071321 | A1* | 2/2024 | Lu | G09G 3/3291 |
| 2024/0274062 | A1* | 8/2024 | Xu | G09G 3/32 |
| 2025/0124852 | A1* | 4/2025 | Xiang | G09G 3/3225 |

FOREIGN PATENT DOCUMENTS

| | | |
|---|---|---|
| KR | 10-2022-0049006 | 4/2022 |

* cited by examiner

*Primary Examiner* — Tom V Sheng
(74) *Attorney, Agent, or Firm* — Innovation Counsel LLP

(57) ABSTRACT

According to an embodiment of the disclosure, a display device includes a display panel having a display area and a non-display area; a plurality of pixels disposed in the display area; a light-emitting element disposed in each of the plurality of pixels; a driving transistor disposed in each of the plurality of pixels and electrically connected to the light-emitting element; and a common circuit disposed in the non-display area and electrically connected to a node between the light-emitting element and the driving transistor.

22 Claims, 11 Drawing Sheets

DISPLAY DEVICE

CROSS-REFERENCE TO RELATED APPLICATION

This application claims priority to and benefits from Korean Patent Application No. 10-2023-0137875 under 35 U.S.C. § 119 filed on Oct. 16, 2023 in the Korean Intellectual Property Office (KIPO), the contents of which in its entirety are incorporated herein by reference.

BACKGROUND

1. Technical Field

The disclosure relates to a display device, and more particularly, to a display device capable of implementing fine pixels.

2. Description of the Related Art

A head mounted display (HMD) is a visual display device worn on a user's head in the form of glasses or a helmet, focusing an image at a close distance in front of the user's eyes. The HMD can implement virtual reality (VR) or augmented reality (AR).

The HMD uses multiple lenses to enlarge an image displayed by a small display unit. Therefore, the display unit used in the HMD needs to provide high-resolution images, for example, images with a resolution of 3000 pixels per inch (PPI) or higher. To achieve this, organic light-emitting diode (OLED)-on-silicon (OLEDoS) is being used as the display unit for the HMD. OLEDOS is a device that displays an image by placing OLEDs on a semiconductor wafer substrate where a complementary metal oxide semiconductor (CMOS) is arranged.

SUMMARY

Aspects of the disclosure provide a display device capable of implementing fine pixels.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a display device includes a display panel having a display area and a non-display area; a plurality of pixels disposed in the display area; a light-emitting element disposed in each of the plurality of pixels; a driving transistor disposed in each of the plurality of pixels and electrically connected to the light-emitting element; and a common circuit disposed in the non-display area and electrically connected to a node between the light-emitting element and the driving transistor.

In an embodiment, the common circuit may be electrically connected to the node through a common line.

In an embodiment, the common circuit may include an initialization transistor which is electrically connected to the node and receives a common voltage and an initialization gate signal.

In an embodiment, the initialization transistor may be electrically connected between the node and a common voltage line which transmits the common voltage, and the initialization gate signal may be applied to a gate electrode of the initialization transistor.

In an embodiment, each of the plurality of pixels may further include a switching transistor which is electrically connected between a data line and a gate electrode of the driving transistor, and an emission control transistor which is electrically connected between a source electrode of the driving transistor and a driving voltage line that transmits a driving voltage.

In an embodiment, a write gate signal may be input to a gate electrode of the switching transistor, and an emission signal may be input to a gate electrode of the emission control transistor.

In an embodiment, further comprising a gate driver transmitting an initialization gate signal to the common circuit and transmitting the write gate signal and the emission signal to each of the plurality of pixels.

In an embodiment, during an initialization period, each of the emission signal, the write gate signal, and the initialization gate signal may have an active level, and a reference voltage may be applied to the data line.

In an embodiment, the write gate signal may have a non-active level during part of the initialization period, before an end of the initialization period.

In an embodiment, during a threshold voltage detection period after the initialization period, the initialization gate signal may have the active level, each of the emission signal and the write gate signal may have a non-active level, and the reference voltage may be applied to the data line.

In an embodiment, a data voltage may be applied to the data line during part of the threshold voltage detection period, before an end of the threshold voltage detection period.

In an embodiment, during a data write period after the threshold voltage detection period, each of the write gate signal and the initialization gate signal may have the active level, the emission signal may have the non-active level, and a data voltage may be applied to the data line.

In an embodiment, during part of the data write period, before an end of the data write period, the write gate signal may have the non-active level, and the reference voltage may be applied to the data line.

In an embodiment, during an emission period after the data write period, the emission signal may have the active level, each of the write gate signal and the initialization gate signal may have the non-active level, and the reference voltage may be applied to the data line.

In an embodiment, the initialization gate signal may have the active level during part of the emission period, after a beginning of the emission period.

In an embodiment, the reference voltage, the driving voltage, and a common voltage may be direct current (DC) voltages.

In an embodiment, the reference voltage may be greater than the common voltage and smaller than the driving voltage.

In an embodiment, each of the plurality of pixels may further include a first capacitor which is electrically connected between a gate electrode and a source electrode of the driving transistor, and a second capacitor which is electrically connected between the source electrode of the driving transistor and a driving voltage line.

In an embodiment, a ratio of a capacitance of the second capacitor to a capacitance of the first capacitor may be about 2:1.

In an embodiment, the initialization transistor and the driving transistor may be transistors of opposite types.

In an embodiment, the common circuit may include a plurality of initialization transistors which are electrically connected in series between the node and a common voltage line that transmits a common voltage.

In an embodiment, the common circuit may include a first common circuit which is disposed on a side of the non-display area and is electrically connected to the node, and a second common circuit which is disposed on another side of the non-display area and is electrically connected to the node.

According to the aforementioned and other embodiments of the disclosure, since multiple pixels share a single common circuit, the number of transistors needed for each pixel can be reduced. As a result, the size of pixels can be reduced, making it possible to implement fine pixels.

It should be noted that the effects of the disclosure are not limited to those described above, and other effects of the disclosure will be apparent from the following description.

BRIEF DESCRIPTION OF THE DRAWINGS

The above and other aspects and features of the disclosure will become more apparent by describing in detail example embodiments thereof with reference to the attached drawings, in which.

DETAILED DESCRIPTION OF THE EMBODIMENTS

Figure 1:
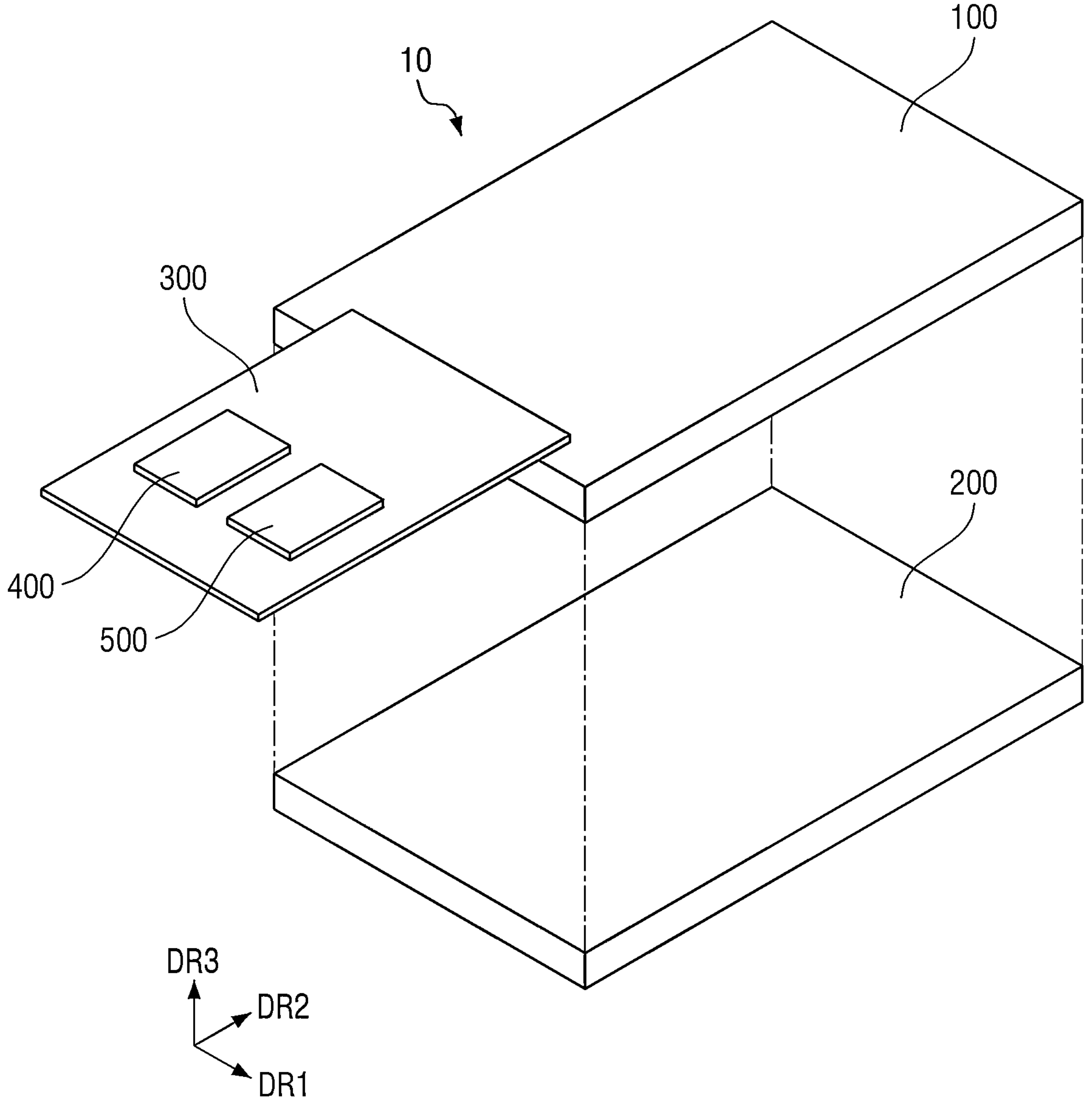
FIG. 1 is a schematic exploded perspective view illustrating a display device according to an embodiment of the disclosure.

The disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be more thorough and complete, and will convey the scope of the disclosure to those skilled in the art.

It will also be understood that when a layer is referred to as being "on" another layer or substrate, it can be directly on the other layer or substrate, or intervening layers may also be present. The same reference numbers and/or characters may indicate the same components throughout the specification. In the attached figures, the thickness of layers and regions may be exaggerated for clarity.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Features of various embodiments of the disclosure may be combined partially or totally. As will be clearly appreciated by those skilled in the art, technically various interactions and operations are possible. Various embodiments can be practiced individually or in combination.

When an element is referred to as being "connected to," or "coupled to" another element, it may be directly connected to or coupled to the other element or intervening elements or layers may be present. When, however, an element is referred to as being "directly connected to," or "directly coupled to" another element, there are no intervening elements or layers present. To this end, the term "connected" may refer to physical, electrical, and/or fluid connection, with or without intervening elements.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Embodiments of the disclosure will be described with reference to the attached drawings.

Figure 2:
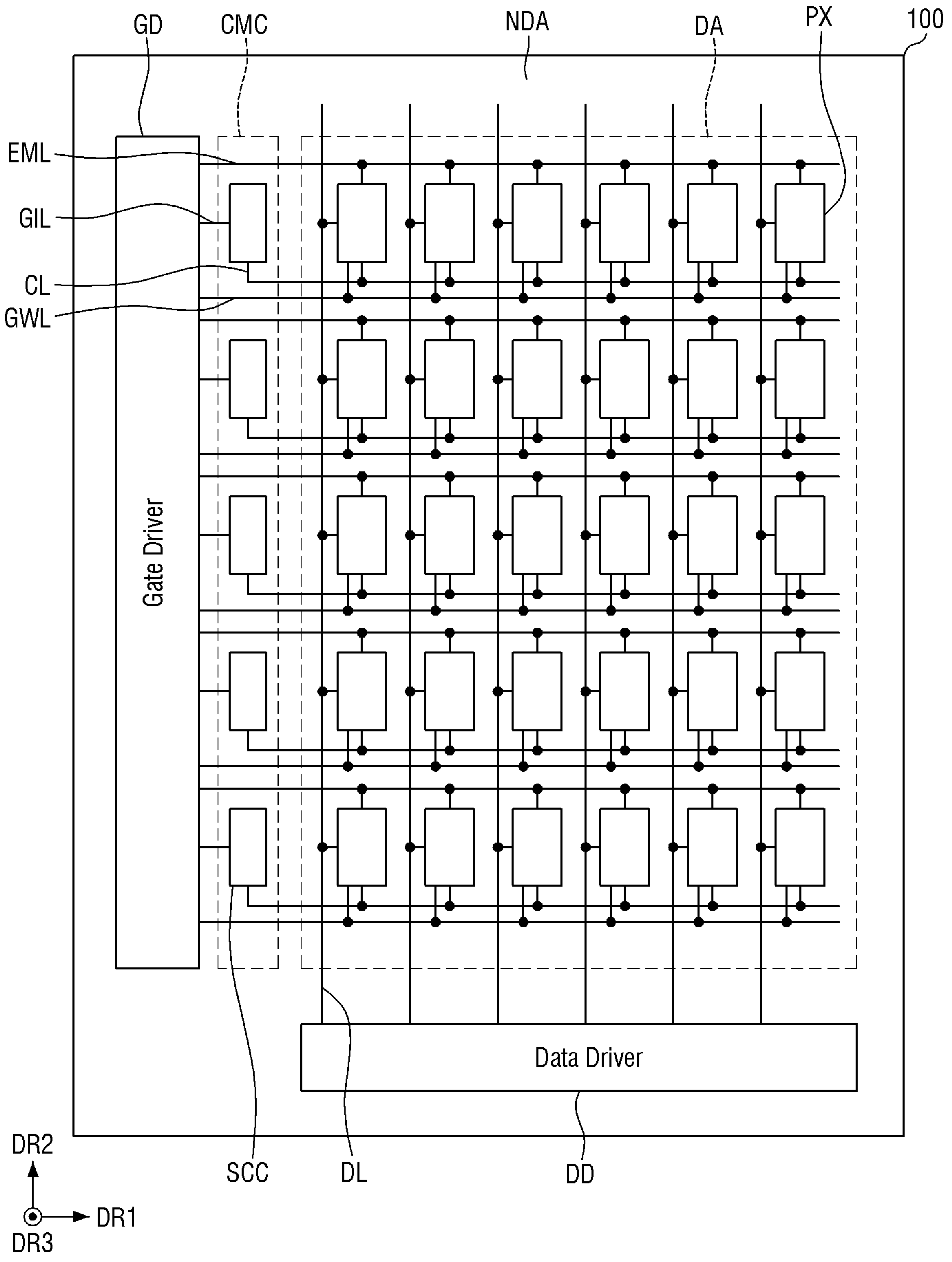
FIG. 2 is a schematic layout view illustrating an example display panel of FIG. 1.

FIG. 1 is a schematic exploded perspective view illustrating a display device according to an embodiment of the disclosure. FIG. 2 is a schematic layout view illustrating an example display panel of FIG. 1.

Referring to FIGS. 1 and 2, a display device 10 may be a device that displays a moving or still image. The display device 10 may be applicable to a portable electronic device such as a mobile phone, a smartphone, a tablet personal computer (PC), a mobile communication terminal, an electronic notepad, an e-book reader, a portable multimedia player (PMP), a navigation system, an ultra-mobile PC (UMPC), or the like. For example, the display device 10 may be applied as a display unit for a television (TV), a laptop computer, a monitor, a billboard, or an Internet of Thing (IoT) device. In another example, the display device 100 may be applied to a smartwatch, a watchphone, or a head mounted display (HMD) for implementing virtual reality or augmented reality.

The display device 10 may include a display panel 100, a heat dissipation layer 200, a circuit board 300, a timing controller 400, and a power supply circuit 500.

The heat dissipation layer 200 may overlap the display panel 100 in a third direction DR3, which is the thickness of the display panel 100. The heat dissipation layer 200 may be disposed on a surface of the display panel 100, for example, on the rear surface of the display panel 100. The heat dissipation layer 200 serves to dissipate heat generated from the display panel 100. In an embodiment, the heat dissipation layer 200 may include a metal layer of a material with high thermal conductivity such as graphite, silver (Ag), copper (Cu), or aluminum (Al).

The circuit board 300 may be electrically connected to one or more pads of the display panel 100 via a conductive adhesive material such as an anisotropic conductive film. For example, the circuit board 300 may be a flexible printed circuit board (FPCB) or a flexible film. FIG. 1 illustrates the circuit board 300 as being unfolded, but the circuit board 300 may be folded up. In case that the circuit board 300 is folded up, a first end of the circuit board 300 may be disposed on the rear surface of the display panel 100. The first end of the circuit board 300 may be opposite to a second end of the circuit board 300 that is connected to one or more pads PD of the display panel 100 via a conductive adhesive.

The timing controller 400 may receive digital video data and timing signals from the outside. The timing controller 400 may generate gate control signals, emission control signals, and/or data control signals according to the timing signals. The timing controller 400 may output the gate control signals and the emission control signals to a gate driver GD and the digital video data and the data control signals to a data driver DD.

The power supply circuit 500 may generate one or more panel driving voltages based on an external power voltage. For example, the power supply circuit 500 may generate a driving voltage, a first common voltage, a second common voltage, and/or an initialization voltage and may supply the generated voltages to the display panel 100.

The timing controller 400 and the power supply circuit 500 may be formed as integrated circuits (ICs) and may be attached to a surface of the circuit board 300. The gate control signals, the emission control signals, the digital video data, and/or the data control signals from the timing controller 400 may be supplied to the display panel 100 through the circuit board 300. The driving voltage, the first common voltage, the second common voltage, and/or the initialization voltage from the power supply circuit 500 may be supplied to the display panel 100 through the circuit board 300.

The display panel 100 may have a shape similar to a rectangle in a plan view. For example, the display panel 100 may have a rectangle-like planar shape with short sides in a first direction DR1 and long sides in a second direction DR2, which intersects with the first direction DR1. The corners where the short sides in the first direction DR1 meet the long sides in the second direction DR2 may be formed with a curvature (e.g., a predetermined or selectable curvature) or may be formed at right angles. The shape of the display panel 100 is not limited to a rectangular shape and may have various shapes, e.g., similar to other polygons, circles, ellipses, etc. The shape of the display device 10 conform to the shape of the display panel 100, but the disclosure is not limited thereto.

As illustrated in FIG. 2, the display panel 100 may include a display area DA, which displays an image, and a non-display area NDA, which does not display an image.

One or more pixels PX, one or more write gate lines GWL, one or more common lines CL, and/or one or more data lines DL may be disposed in the display area DA of the display panel 100. Each of the pixels PX may include a light-emitting element ED. The pixels PX may be arranged in a matrix form in the first and second directions DR1 and DR2.

Each of the pixels PX may be connected to a write gate line GWL, a the common line CL, an emission line EML, and a data line DL. The write gate lines GWL may extend in the first direction DR1, and a horizontal line of pixels PX, which is aligned in the extension direction (e.g., the first direction DR1) of the write gate lines GWL, may be connected to the same write gate line GWL, the same common line CL, and the same emission line EML. Moreover, a horizontal line of pixels PX may be connected to different data lines DL.

The gate driver GD, the data driver DD, a common circuit CMC, and/or one or more initialization gate lines GIL may be disposed in the non-display area NDA of the display panel 100.

As depicted in FIG. 2, the gate driver GD may be connected to the common circuit CMC. For example, the gate driver GD may be connected to the common circuit CMC through one or more initialization gate lines GIL. The gate driver GD generates one or more write signals and one or more initialization gate signals based on the gate control signals from the timing controller 400, and may generate one or more emission signals based on the emission control signals from that timing controller 400. The gate driver GD may supply the generated initialization gate signals to the common circuit CMC. For example, the gate driver GD may supply the initialization gate signals to the common circuit CMC through the initialization gate lines GIL. Moreover, the gate driver GD may supply the write gate signals to the pixels PX through the write gate lines GWL, and may also supply the emission signals to the pixels PX through the emission lines EML.

In one embodiment, since multiple pixels PX may share a single common circuit CMC, the number of transistors required for each of the pixels PX can be reduced. As a result, the size of the pixels PX can be reduced, enabling the implementation of fine pixels.

The data driver DD may be connected to one or more data lines DL. The data driver DD may supply one or more data signals to the data lines DL. The data driver DD may receive the digital video data and the data control signals from the timing controller 400. The data driver DD may convert the digital video data into analog data voltages based on the data control signals from the timing controller 400, and may supply the analog data voltages to the data lines DL. In this case, a horizontal line of pixels PX may be selected by a write gate signal from the gate driver GD, and the data voltages may be supplied to the selected horizontal line of pixels PX. For example, the data driver DD may generate one or more data voltages based on the data control signals from the timing controller 400, and may supply the generated data voltages to the data lines DL. The data driver DD may generate a reference voltage and may supply the generated reference voltage to the data lines DL.

The common circuit CMC may include one or more sub-common circuits SCC. The sub-common circuits SCC may be arranged in a line in the non-display area NDA in the second direction DR2. Each of the sub-common circuits SCC may be commonly connected to a horizontal line of pixels PX. For example, referring to FIG. 2, the common circuit CMC may include five sub-common circuits SCC, e.g., first through fifth sub-common circuits SCC that are sequentially arranged in the opposite direction of the second direction DR2, the first sub-common circuit SCC may be commonly connected to six pixels PX that are aligned next to the first sub-common circuit SCC in the first direction DR1, the second sub-common circuit SCC may be commonly connected to six pixels PX that are aligned next to the second sub-common circuit SCC in the first direction DR1, the third sub-common circuit SCC may be commonly connected to six pixels PX that are aligned next to the third sub-common circuit SCC in the first direction DR1, the fourth sub-common circuit SCC may be commonly connected to six pixels PX that are aligned next to the fourth sub-common circuit SCC in the first direction DR1, and the fifth sub-common circuit SCC may be commonly connected to six pixels PX that are aligned next to the fifth sub-common circuit SCC in the first direction DR1.

Figure 3:
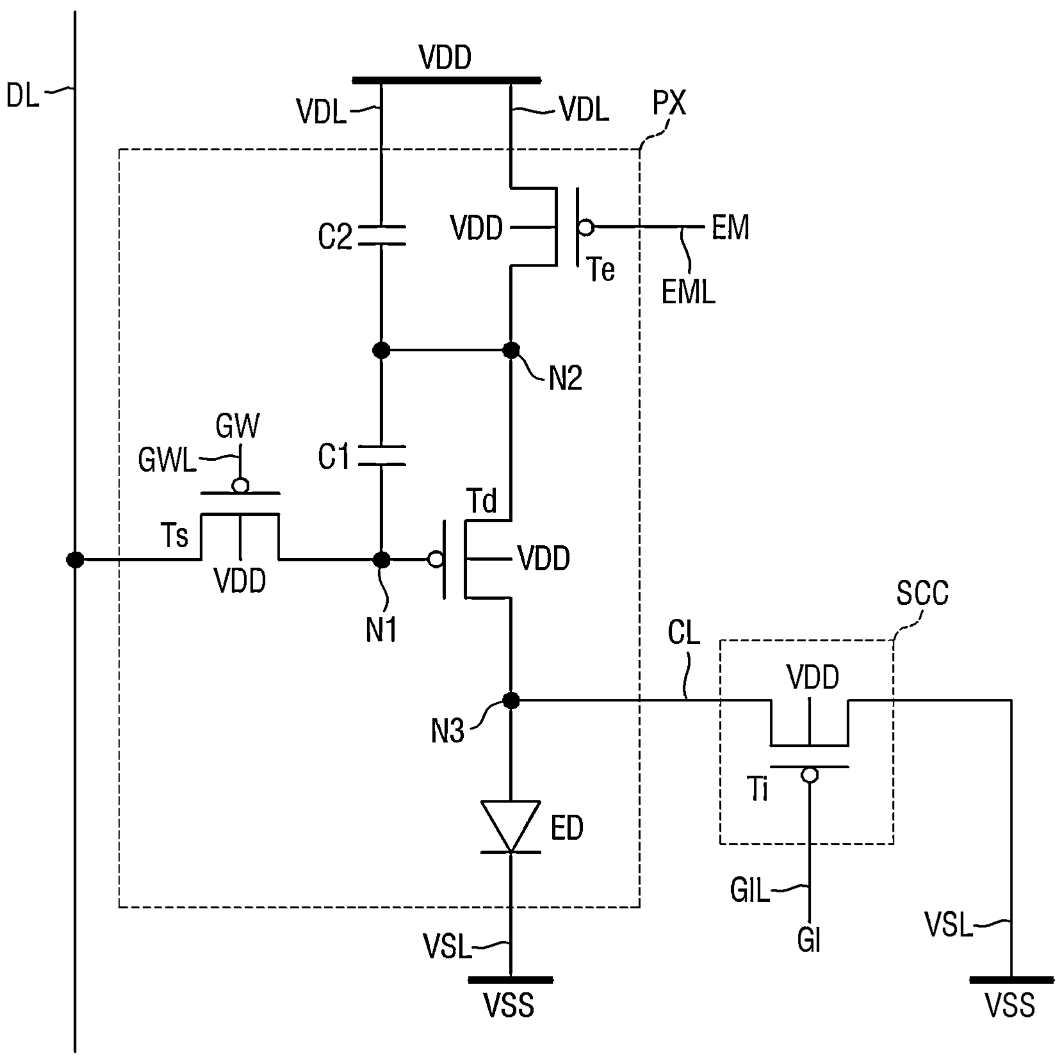
FIG. 3 is a schematic diagram of an equivalent circuit illustrating an example pixel of FIG. 2 and a sub-common circuit connected to the example pixel.

FIG. 3 is a circuit diagram illustrating an example pixel PX of FIG. 2 and a sub-common circuit SCC connected to the corresponding pixel PX.

Referring to FIG. 3, the pixel PX may include a driving transistor Td, a switching transistor Ts, a first capacitor C1, a second capacitor C2, and a light-emitting element ED.

The driving transistor Td may include a gate electrode, a source electrode, a drain electrode, and a body electrode. The driving transistor Td may control a source-drain current (hereafter, the driving current) based on a data voltage applied to the gate electrode. The driving current flowing through the channel region of the driving transistor Td may be proportional to the square of the difference between a threshold voltage and the voltage between the source electrode and the gate electrode. The gate electrode of the driving transistor Td may be electrically connected to a first node N1, the source electrode of the driving transistor Td may be electrically connected to a second node N2, the drain electrode of the driving transistor Td may be electrically connected to a third node N3, and the body electrode of the driving transistor Td may be electrically connected to a driving voltage line VDL, which transmits a driving voltage VDD.

The light-emitting element ED may emit light upon receiving the driving current. The luminance or brightness of the light-emitting element ED may be proportional to the magnitude of the driving current. The light-emitting element ED may be an organic light-emitting diode (OLED) including a first electrode (e.g., an anode), a second electrode (e.g., a cathode), and an organic luminescent layer positioned between the first and second electrodes. As another example, the light-emitting element ED may be an inorganic light-emitting element including a first electrode, a second electrode, and an inorganic semiconductor positioned between the first and second electrodes. As yet another example, the light-emitting element ED may be a quantum-dot light-emitting element including a first electrode, a second electrode, and a quantum-dot luminescent layer positioned between the first and second electrodes. As still another example, the light-emitting element ED may be a micro-light-emitting diode (micro-LED). The first electrode of the light-emitting element ED may be electrically connected to the third node N3. The second electrode of the light-emitting element ED may be electrically connected to a common voltage line VSL, which transmits a common voltage VSS.

The switching transistor Ts may be turned on by a write gate signal GW from a write gate line GWL, thereby electrically connecting the data line DL and the first node N1. The gate electrode of the switching transistor Ts may be electrically connected to the write gate line GWL, the source electrode of the switching transistor Ts may be electrically connected to the data line DL, the drain electrode of the switching transistor Ts may be electrically connected to the first node N1, and the body electrode of the switching transistor Ts may be electrically connected to the driving voltage line VDL. The data line DL may transmit a data voltage ("Vdt" of FIG. 4) or a reference voltage ("Vref" of FIG. 4).

The first capacitor C1 may be electrically connected between the first and second nodes N1 and N2. For example, the first electrode of the first capacitor C1 may be electrically connected to the first node N1, and the second electrode of the first capacitor C1 may be electrically connected to the second node N2.

The second capacitor C2 may be electrically connected between the second node N2 and the driving voltage line VDL. For example, the first electrode of the second capacitor C2 may be electrically connected to the second node N2, and the second electrode of the second capacitor C2 may be electrically connected to the driving voltage line VDL.

The sub-common circuit SCC may include an initialization transistor Ti.

The initialization transistor Ti may be turned on by an initialization gate signal GI from an initialization gate line GIL, thereby electrically connecting the third node N3 and the common voltage line VSL. The gate electrode of the initialization transistor Ti may be electrically connected to the initialization gate line GIL, the source electrode of the initialization transistor Ti may be electrically connected to the third node N3, the drain electrode of the initialization transistor Ti may be electrically connected to the common voltage line VSL, and the body electrode of the initialization transistor Ti may be electrically connected to the driving voltage line VDL.

The third node N3 may be connected to a common line CL. In other words, the third nodes N3 of a horizontal line of pixels PX including the pixel PX of FIG. 3 may be commonly connected to the common line CL.

In one embodiment, as the horizontal line of each of the pixels PX may share one sub-common circuit SCC, some transistors (e.g., the initialization transistor Ti) can be removed from each of the pixels PX. As a result, the size of each pixel PX can be reduced, enabling the implementation of fine pixels.

Figure 4:
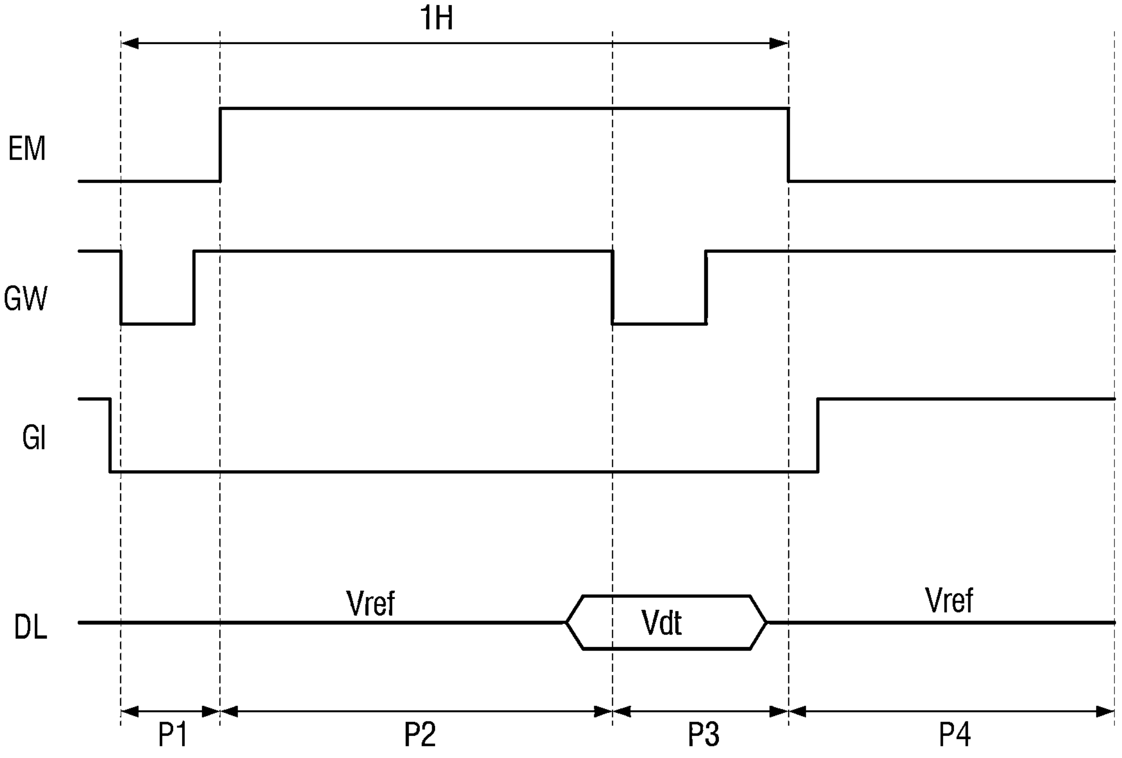
FIG. 4 is an example timing diagram illustrating an emission signal, a write gate signal, an initialization gate signal, a reference voltage, and a data voltage of FIG. 3.

FIG. 4 is a schematic timing diagram illustrating an emission signal EM, the write gate signal GW, the initialization gate signal GI, the reference voltage Vref, and the data voltage Vdt of FIG. 3.

Referring to FIG. 4, the display device 10 may operate based on an initialization period P1, a threshold voltage detection period P2, a data write period P3, and an emission period P4.

During each of the initialization period P1, the threshold voltage detection period P2, the data write period P3, and the emission period P4, the emission signal EM, the write gate signal GW, and the initialization gate signal GI may have an active level or a non-active level. Here, the active level may refer to a voltage or level that can turn on a transistor. In other words, a signal with the active level may have a voltage greater than the threshold voltage of a corresponding transistor. For example, referring to FIG. 3, in case that the driving transistor Td, the switching transistor Ts, and the initialization transistor Ti are P-type transistors, the active level of each signal for the driving transistor Td, the switching transistor Ts, and the initialization transistor Ti may mean a low level (e.g., a negative level or a low voltage level).

The non-active level may refer to a voltage or level that can turn off a transistor (e.g., an off-stage voltage). For example, a signal with the non-active level may have a voltage smaller than the threshold voltage of a corresponding transistor. In an embodiment, referring to FIG. 3, in case that the driving transistor Td, the switching transistor Ts, and the initialization transistor Ti are P-type transistors, the non-active level of each signal for the driving transistor Td, the switching transistor Ts, and the initialization transistor Ti may mean a high level (e.g., a positive level or a high voltage level).

As another example, in case that the driving transistor Td, the switching transistor Ts, and the initialization transistor Ti are N-type transistors, the active level of each signal may mean a high level (e.g., a positive level or a high voltage level), and the non-active level of each signal may mean a low level (e.g., a negative level or a low voltage level).

During the initialization period P1, each of the emission signal EM, the write gate signal GW, and the initialization gate signal GI may have the active level. During the initialization period P1, the write gate signal GW may have the non-active level for some time before the end of the initialization period P1 (e.g., before the transition of the emission signal EM from the active level to the non-active level). During the initialization period P1, the reference voltage Vref may be applied to the data line DL.

During the threshold voltage detection period P2, the initialization gate signal GI may have the active level, and each of the emission signal EM and the write gate signal GW may have the non-active level. During the threshold voltage detection period P2, the reference voltage Vref may be applied to the data line DL. The data voltage Vdt may be applied to the data line DL for some time before the end of the threshold voltage detection period P2 (e.g., before the transition of the write gate signal GW from the non-active level to the active level).

During the data write period P3, each of the write gate signal GW and the initialization gate signal GI may have the active level, and the emission signal EM may have the non-active level. The write gate signal GW may have the non-active level for some time before the end of the data write period P3 (e.g., before the transition of the emission signal EM from the non-active level to the active level). During the data write period P3, the data voltage Vdt may be applied to the data line DL. Here, the data voltage Vdt may be a voltage with a gray level (or luminance) for displaying an image. For some time before the end of the data write period P3 (e.g., before the transition of the emission signal EM from the non-active level to the active level), the reference voltage Vref may be applied to the data line DL.

During the emission period P4, the emission signal EM may have the active level, and each of the write gate signal GW and the initialization gate signal GI may have the non-active level. The initialization gate signal GI may have the active level for some time after the beginning of the emission period P4 (e.g., after the transition of the emission signal EM from the non-active level to the active level). During the emission period P4, the reference voltage Vref may be applied to the data line DL.

The reference voltage Vref, the driving voltage VDD, and the common voltage VSS may be DC voltages. The reference voltage Vref may be smaller than the driving voltage VDD and larger than the common voltage VSS.

Operations of the display device 10 will hereinafter be described with reference to FIGS. 5 through 8. Referring to FIGS. 5 through 8, transistors circled with dotted lines are transistors in a turned-on state, and transistors not circled with dotted lines are transistors in a turned-off state.

The operation of the display device 10 during the initialization period P1 will hereinafter be described with reference to FIGS. 4 and 5.

Figure 5:
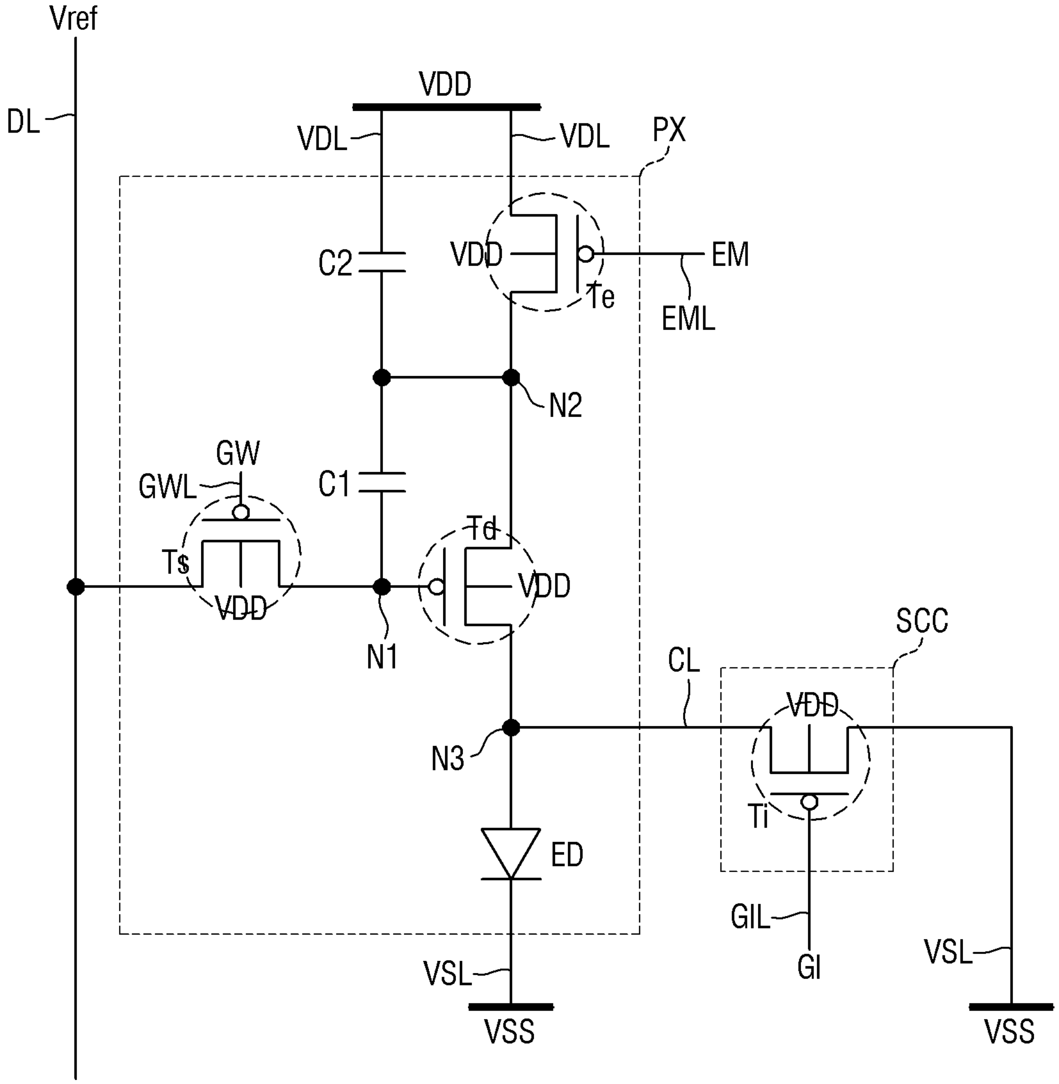
FIG. 5 is a schematic diagram of an equivalent circuit illustrating an operation of the display device of FIG. 3 during an initialization period of FIG. 4.

FIG. 5 is a schematic diagram of an equivalent circuit illustrating the operation of the display device 10 of FIG. 3 during the initialization period P1 of FIG. 4.

Referring to FIGS. 4 and 5, each of the emission signal EM, the write gate signal GW, and the initialization gate signal GI may have the active level. The write gate signal GW may have the non-active level for some time before the end of the initialization period P1 (e.g., before the transition of the emission signal EM from the active level to the non-active level). During the initialization period P1, the reference voltage Vref may be applied to the data line DL.

The emission signal EM with the active level may be applied to the gate electrode of an emission control transistor Te through an emission line EML. As a result, the emission control transistor Te may be turned on.

The write gate signal GW with the active level may be applied to the gate electrode of the switching transistor Ts through the write gate line GWL. As a result, the switching transistor Ts may be turned on.

The initialization gate signal GI with the active level may be applied to the gate electrode of the initialization transistor Ti through the initialization gate line GIL. As a result, the initialization transistor Ti may be turned on.

During the initialization period P1, as the switching transistor Ts is turned on, the driving transistor Td may also be turned on. For example, the reference voltage Vref from the data line DL may be applied to the gate electrode of the driving transistor Td through the turned-on switching transistor Ts. Since the reference voltage Vref is smaller than the driving voltage VDD, which is applied to the source electrode (i.e., the second node N2) of the driving transistor Td, the driving transistor Td may be turned on. In response to the driving transistor Td being turned on, the drain electrode (i.e., the third node N3) of the driving transistor Td may have a value corresponding to the driving voltage VDD.

During the initialization period P1, as the switching transistor Ts, the initialization transistor Ti, and the emission control transistor Te are turned on, the gate electrode (i.e., the first node N1), the source electrode (i.e., the second node N2), and the drain electrode (i.e., the third node N3) of the driving transistor Td may be initialized. For example, the reference voltage Vref from the data line DL may be applied to the first node N1, which is the gate electrode of the driving transistor Td, through the turned-on switching transistor Ts. The driving voltage VDD from the driving voltage line VDL may be applied to the second node N2, which is the source electrode of the driving transistor Td, through the turned-on emission control transistor Te. The common voltage VSS from the common voltage line VSL may be applied to the third node N3, which is the drain electrode of the driving transistor Td, through the turned-on initialization transistor Ti. Consequently, the voltages of the gate electrode, the source electrode, and the drain electrode of the driving transistor Td may be initialized. Specifically, the gate electrode of the driving transistor Td may be initialized by the reference voltage Vref, the source electrode of the driving transistor Td may be initialized by the driving voltage VDD, and the drain electrode of the driving transistor Td may be initialized by the common voltage VSS. Furthermore, as the common voltage VSS is applied to both the first and second electrodes of the light-emitting element ED, the voltage across both ends of the light-emitting element ED during the initialization period P1 may be smaller than its threshold voltage. Therefore, the light-emitting element ED may remain off during the initialization period P1.

An operation of the display device 10 during the threshold voltage detection period P2 will hereinafter be described with reference to FIGS. 4 and 6.

Figure 6:
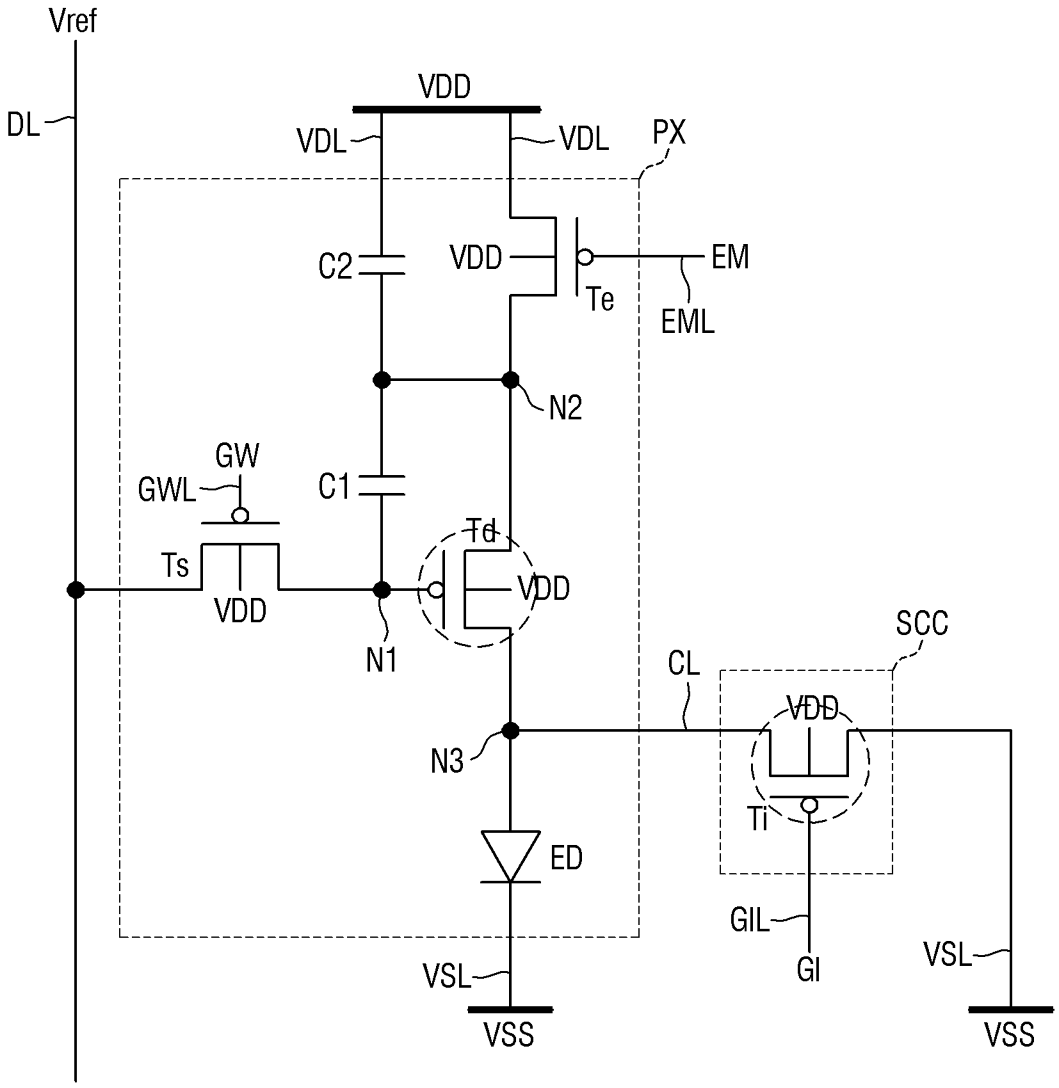
FIG. 6 is a schematic diagram of an equivalent circuit illustrating an operation of the display device of FIG. 3 during a threshold voltage detection period of FIG. 4.

FIG. 6 is a schematic diagram of an equivalent circuit illustrating an operation of the display device 10 during the threshold voltage detection period P2 of FIG. 4.

Referring to FIGS. 4 and 6, during the threshold voltage detection period P2, the initialization gate signal GI may have the active level, and each of the emission signal EM and the write gate signal GW may have the non-active level. During the threshold voltage detection period P2, the reference voltage Vref may be applied to the data line DL. For some period before the end of the threshold voltage detection period P2 (e.g., before the transition of the write gate signal GW from the non-active level to the active level), the data voltage Vdt may be applied to the data line DL.

The initialization gate signal GI with the active level may be applied to the gate electrode of the initialization transistor Ti through the initialization gate line GIL. As a result, the initialization transistor Ti may be turned on.

The emission signal EM with the non-active level may be applied to the gate electrode of the emission control transistor Te through the emission line EML. As a result, the emission control transistor Te may be turned off.

The write gate signal GW with the non-active level may be applied to the gate electrode of the switching transistor Ts through the write gate line GWL. As a result, the switching transistor Ts may be turned off. As the switching transistor Ts is turned off, the first node N1 may remain in a floating state.

During the threshold voltage detection period P2, the driving transistor may remain in the turned-on state due to the reference voltage Vref and the driving voltage VDD applied to the first and second nodes N1 and N2, respectively, previously (e.g., during the initialization period P1).

In case that the emission control transistor Te, the driving transistor Td, and the initialization transistor Ti are turned on, the driving current may flow from the driving voltage line VDL to the common voltage line VSL. The driving current may cause the voltage of the second node N2 (i.e., the voltage of the source electrode of the driving transistor Td) to fluctuate in a decreasing manner. Due to the fluctuation of the voltage of the second node N2 and the coupling of the first capacitor C1, the voltage of the first node N1 (i.e., the voltage of the gate electrode of the driving transistor Td) may also fluctuate. Therefore, a gate-source voltage of the driving transistor Td may remain constant. However, while the voltage of the body electrode of that driving transistor Td, i.e., the driving voltage VDD, remains constant, the voltage of the second node N2 fluctuates, and as a result, the absolute value of a threshold voltage Vth of the driving transistor Td shifts in an increasing manner. For example, the threshold voltage Vth of the driving transistor Td may increase in a negative direction. In case that the threshold voltage Vth of the driving transistor Td gradually increases to become substantially equal to the gate-source voltage, the driving transistor Td is turned off, and its voltage at the corresponding moment may be stored by the first capacitor C1. In other words, the threshold voltage Vth of the driving transistor Td may be detected by the first capacitor C1. Accordingly, in case that the driving transistor Td is turned off during the threshold voltage detection period P2, the threshold voltage Vth of the driving transistor Td may be stored in the first capacitor C1.

Thus, during the threshold voltage detection period P2, the threshold voltage Vth of the driving transistor Td may be detected and maintained by the first capacitor C1.

During the threshold voltage detection period P2, since the voltage across both ends of the light-emitting element ED is maintained at the same voltage (e.g., at the common voltage VSS), the light-emitting element ED may remain off.

An operation of the display device 10 during the data write period P3 will hereinafter be described with reference to FIGS. 4 and 7.

Figure 7:
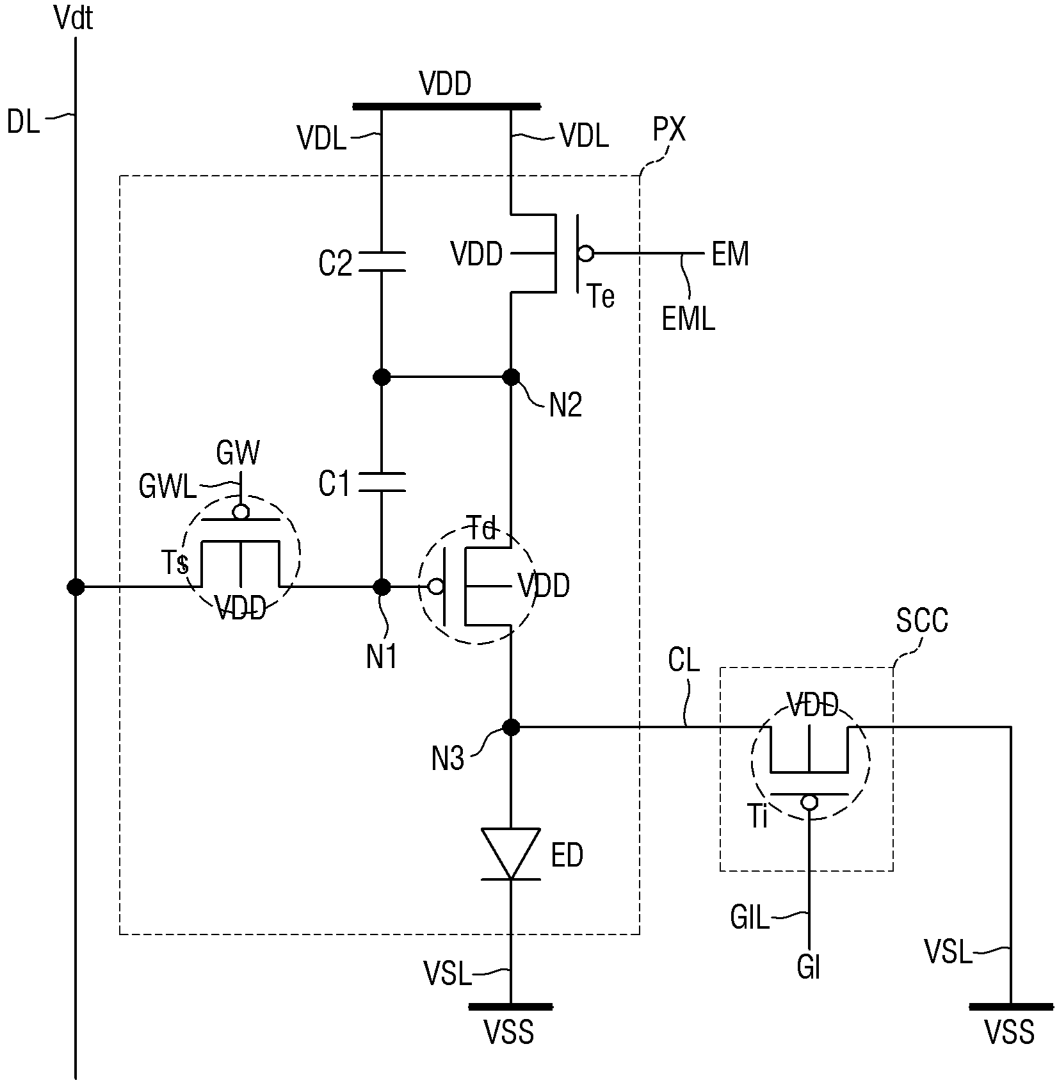
FIG. 7 is a schematic diagram of an equivalent circuit illustrating an operation of the display device of FIG. 3 during a data write period of FIG. 4.

FIG. 7 is a schematic diagram of an equivalent circuit illustrating the operation of the display device 10 of FIG. 3 during the data write period P3 of FIG. 4.

Referring to FIGS. 4 and 7, during the data write period P3, each of the write gate signal GW and the initialization gate signal GI may have the active level, and the emission signal EM may have the non-active level. This write gate signal GW may have the non-active level for some time before the end of the data write period P3 (e.g., before the transition of the emission signal EM from the non-active level to the active level). During the data write period P3, the data voltage Vdt may be applied to the data line DL. Here, the data voltage Vdt may be a voltage with a particular gray level (or brightness) for displaying an image. The reference voltage Vref may be applied to the data line DL for some time before the end of the data write period P3 (e.g., before the transition of the emission signal EM from the non-active level to the active level).

The write gate signal GW with the active level may be applied to the gate electrode of the switching transistor Ts through the write gate line GWL. As a result, the switching transistor Ts may be turned on.

The initialization gate signal GI with the active level may be applied to the gate electrode of the initialization transistor Ti through the initialization gate line GIL. As a result, the initialization transistor Ti may be turned on.

The emission signal EM with the non-active level may be applied to the gate electrode of the emission control transistor Te through the emission line EML. As a result, the emission control transistor Te may be turned off.

As illustrated in FIG. 7, the data voltage Vdt may be applied to the first node N1 through the data line DL and the turned-on switching transistor Ts. Here, in case that the driving transistor Td, which was turned off during a previous data write period P3, remains off during the current data write period P3, the second node N2 may remain in a floating state. In an embodiment, during the data write period P3, the driving transistor Td may have a weakly turned-on state, but may remain almost close to the floating state.

As the second node N2 remains in a floating state, the voltage of the second node N2 may increase by as much as the voltage (e.g., the data voltage Vdt) coupled by the first capacitor C1. Specifically, the voltage of the second node N2 may correspond to the sum of the data voltage Vdt and the threshold voltage Vth of the driving transistor Td (e.g., the absolute value of the threshold voltage Vth of the driving transistor Td). Since the data voltage Vdt may be divided by the first and second capacitors C1 and C2, the range of the data voltage Vdt (e.g., the range of gray levels) may be expanded. Therefore, fine gray expression becomes possible, potentially improving the display quality of the display device 10. In one embodiment, the capacitances of the first and second capacitors C1 and C2 may be the same, but the disclosure is not limited thereto. As another example, the capacitance of the second capacitor C2 may be greater than the capacitance of the first capacitor C1. For example, the ratio of the capacitance of the second capacitor C2 to the capacitance of the first capacitor C1 may be about 2:1.

During the data write period P3, a differential voltage (e.g., the gate-source voltage) between the first node N1, which is the gate electrode of the driving transistor Td, and the source electrode of the driving transistor Td may be maintained by the first capacitor C1. The gate-source voltage may include not only the data voltage Vdt but also the threshold voltage Vth of the driving transistor Td.

During the data write period P3, as the voltage across ends of the light-emitting element ED is maintained at the same voltage (e.g., the common voltage VSS), the light-emitting element ED may remain off during the data write period P3.

An operation of the display device 10 during the emission period P4 will hereinafter be described with reference to FIGS. 4 and 8.

Figure 8:
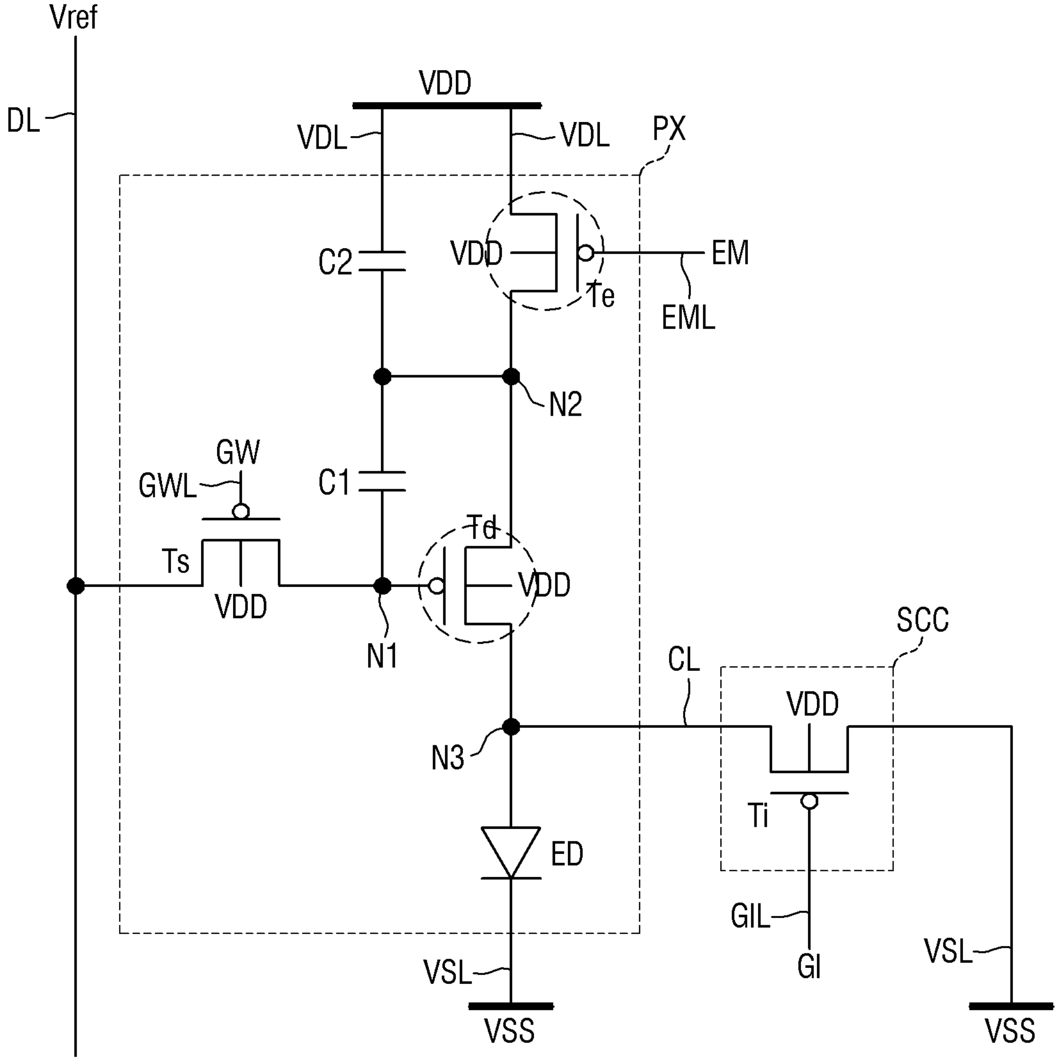
FIG. 8 is a schematic diagram of an equivalent circuit illustrating an operation of the display device of FIG. 3 during an emission period of FIG. 4.

FIG. 8 is a schematic diagram of an equivalent circuit illustrating the operation of the display device 10 of FIG. 3 during the emission period P4 of FIG. 4.

Referring to FIGS. 4 and 8, during the emission period P4, the emission signal EM may have the active level, and each of the write gate signal GW and the initialization gate signal GI may have the non-active level. The initialization gate signal GI may have the active level for some time after the beginning of the emission period P4 (e.g., after the transition of the emission signal EM from the non-active level to the active level). Also, during the emission period P4, the reference voltage Vref may be applied to the data line DL.

The emission signal EM with the active level may be applied to the gate electrode of the emission control transistor Te through the emission line EML. As a result, the emission control transistor Te may be turned on.

The write gate signal GW with the non-active level may be applied to the gate electrode of the switching transistor Ts through the write gate line GWL. As a result, the switching transistor Ts may be turned off.

The initialization gate signal GI with the non-active level may be applied to the gate electrode of the initialization transistor Ti through the initialization gate line GIL. As a result, the initialization transistor Ti may be turned off.

During the emission period P4, the driving transistor Td may remain in the turned-on state due to the gate-source voltage maintained by the first capacitor C1.

During the emission period P4, as the emission control transistor Te and the driving transistor Td are turned on, the driving voltage VDD may be applied to the first electrode (i.e., the third node N3) of the light-emitting element ED through the turned-on emission control transistor Te and the turned-on driving transistor Td. Since the gate-source voltage maintained by the first capacitor C1 may include the threshold voltage Vth of the driving transistor Td, the magnitude of the driving current flowing through the light-emitting element ED may be determined based on the data voltage Vdt and the threshold voltage Vth of the driving transistor Td. Therefore, the driving current applied to the light-emitting element ED may accurately reflect the magnitude of the data voltage Vdt. In other words, the supplied driving current may have an exact value with the threshold voltage Vth of the driving transistor Td compensated for. Accordingly, the driving current can be determined by compensating for different threshold voltages Vth of the driving transistors Td for different pixels PX, and thus, deviations in luminance between the pixels PX that may be caused by such different threshold voltages Vth can be minimized. Therefore, the display quality of the display device 10 can be improved.

During the emission period P4, the voltage of the first node N1 (e.g., the voltage of the gate electrode of the driving transistor Td) may have a value corresponding to "VDD−(Vref+|Vth|+Vdt')" where Vdt' may be the voltage of the second node N2.

Figure 9:
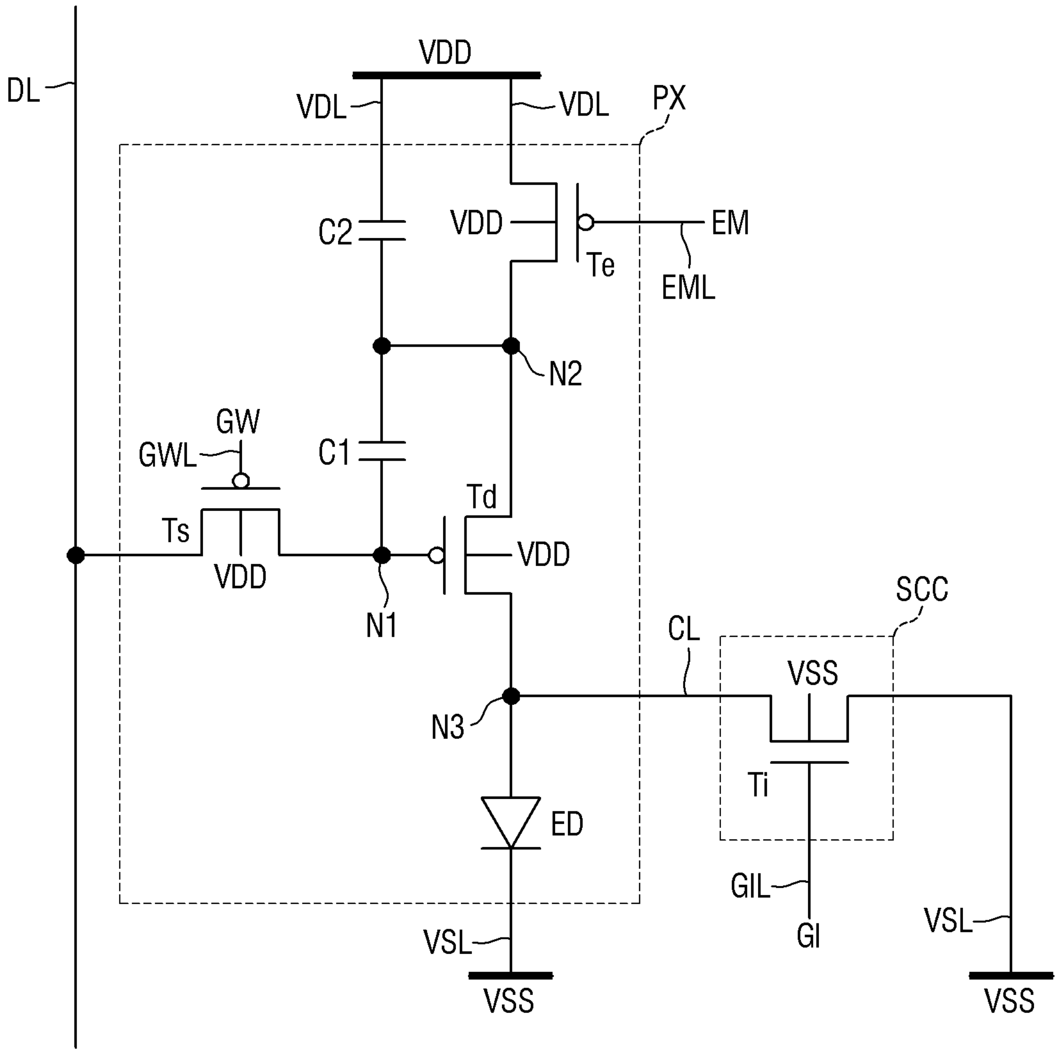
FIG. 9 is a schematic diagram of an equivalent circuit illustrating another example pixel of FIG. 2 and a sub-common circuit connected to the example pixel.

FIG. 9 is a schematic diagram of an equivalent circuit illustrating another example pixel PX of FIG. 2 and a sub-common circuit SCC connected to the example pixel PX.

The embodiment in FIG. 9 differs from the embodiment of FIG. 3 at least in the configuration of an initialization transistor Ti of the sub-common circuit SCC, and thus will hereinafter be described, focusing mainly on the difference with the embodiment of FIG. 3.

Referring to FIG. 9, the initialization transistor Ti may be turned on by an initialization gate signal GI from an initialization gate line GIL, thereby electrically connecting a third node N3 and a common voltage line VSL. The gate electrode of the initialization transistor Ti may be electrically connected to the initialization gate line GIL, the source electrode of the initialization transistor Ti may be electrically connected to the third node N3, the drain electrode of the initialization transistor Ti may be electrically connected to the common voltage line VSL, and the body electrode of the initialization transistor Ti may be electrically connected to the common voltage line VSL, which transmits a common voltage VSS.

The initialization transistor Ti may be of the opposite type to other transistors of the pixel PX, e.g., a switching transistor Ts, an emission control transistor Te, and a driving transistor Td. For example, in case that the switching transistor Ts, the emission control transistor Te, and the driving transistor Td are P-type transistors (e.g., P-type metal-oxide semiconductor field-effect transistors (MOSFETs)), the initialization transistor Ti may be an N-type transistor (e.g., an N-type MOSFET).

N-type transistors may be more advantageous than P-type transistors to transmit the common voltage VSS. In other words, in case that the initialization transistor Ti, which is connected to the common voltage line VSL through its source electrode, is formed as an N-type transistor with a high electron mobility, the common voltage VSS can be efficiently transmitted through the turned-on initialization transistor Ti.

Figure 10:
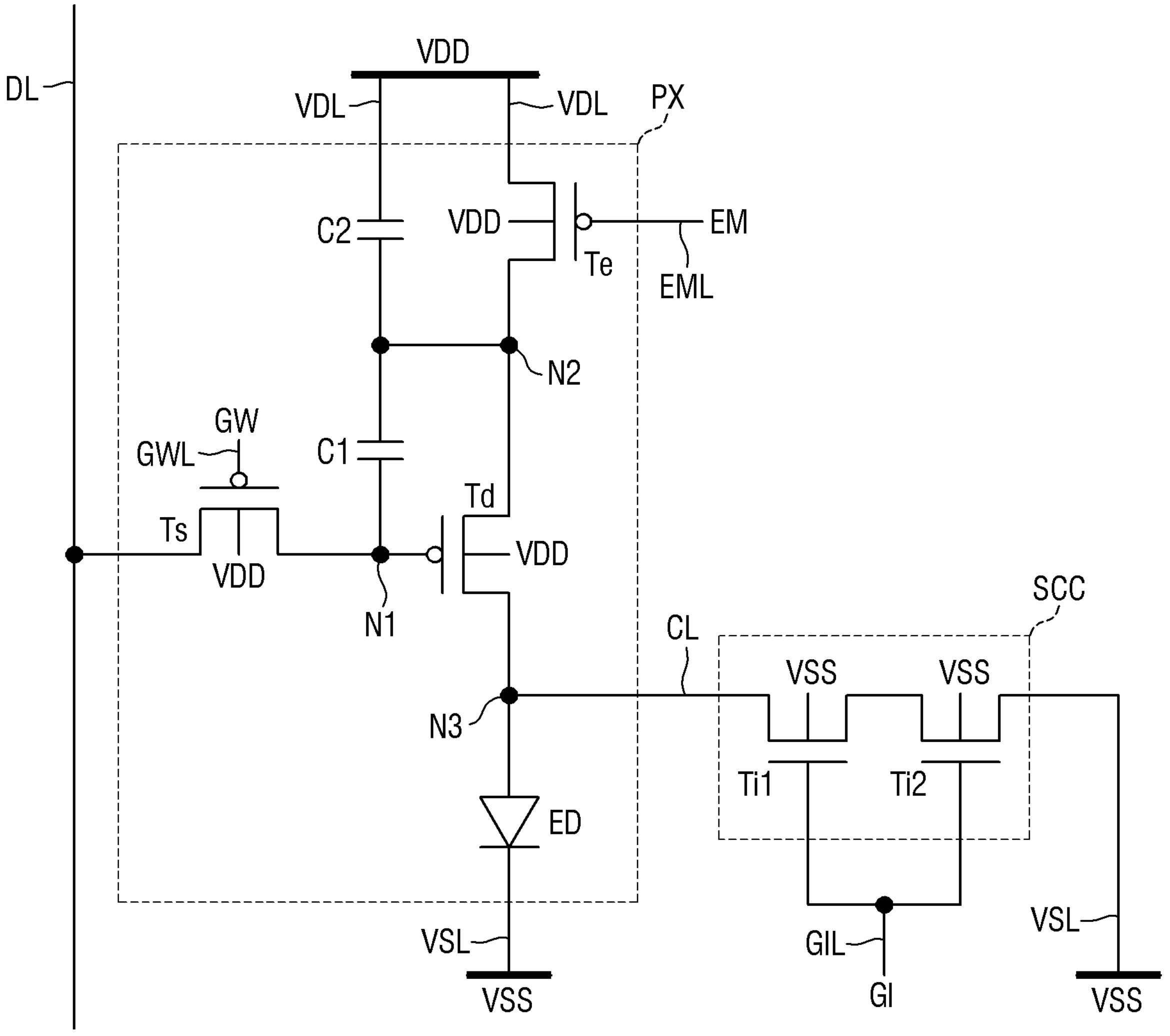
FIG. 10 is a schematic diagram of an equivalent circuit illustrating another example pixel of FIG. 2 and a sub-common circuit connected to the example pixel.

FIG. 10 is a schematic diagram of an equivalent circuit illustrating another example pixel PX of FIG. 2 and a sub-common circuit SCC connected to the example pixel PX.

The embodiment in FIG. 10 differs from the embodiment of FIG. 3 at least in the configuration of an initialization transistor Ti of the sub-common circuit SCC, and thus will hereinafter be described, focusing mainly on the difference with the embodiment of FIG. 3.

Referring to FIG. 10, the sub-common circuit SCC may include multiple initialization transistors (Ti1 and Ti2) connected in series. For example, the sub-common circuit SCC may include first and second initialization transistors Ti1 and Ti2.

The first and second initialization transistors Ti1 and Ti2 may be connected in series between a third node N3 and a common voltage line VSL.

The first and second initialization transistors Ti1 and Ti2 may be of the opposite type to other transistors of the pixel PX, e.g., a switching transistor Ts, an emission control transistor Te, and a driving transistor Td. For example, in case that the switching transistor Ts, the emission control transistor Te, and the driving transistor Td are P-type transistors (e.g., P-type MOSFETs), the first and second initialization transistors Ti1 and Ti2 may be N-type transistors (e.g., N-type MOSFETs).

The first initialization transistor Ti1 may be turned on by an initialization gate signal GI from an initialization gate line GIL, thereby electrically connecting the third node N3 to the drain electrode of the second initialization transistor Ti2. The gate electrode of the first initialization transistor Ti1 may be electrically connected to the initialization gate line GIL, the drain electrode of the first initialization transistor Ti1 may be electrically connected to the third node N3, the source electrode of the first initialization transistor Ti1 may be electrically connected to the drain electrode of the second initialization transistor Ti2, and the body electrode of the first initialization transistor Ti1 may be electrically connected to the common voltage line VSL.

The second initialization transistor Ti2 may be turned on by the initialization gate signal GI from the initialization gate line GIL, thereby electrically connecting the source electrode of the first initialization transistor Ti1 to the common voltage line VSL. The gate electrode of the second initialization transistor Ti2 may be electrically connected to the initialization gate line GIL, the drain electrode of the second initialization transistor Ti2 may be electrically connected to the source electrode of the first initialization transistor Ti1, and the source and body electrodes of the second initialization transistor Ti2 may be electrically connected to the common voltage line VSL.

In case that the sub-common circuit SCC includes multiple initialization transistors connected in series between the third node N3 and the common voltage line VSL, the leakage current of the multiple initialization transistors can be minimized.

Figure 11:
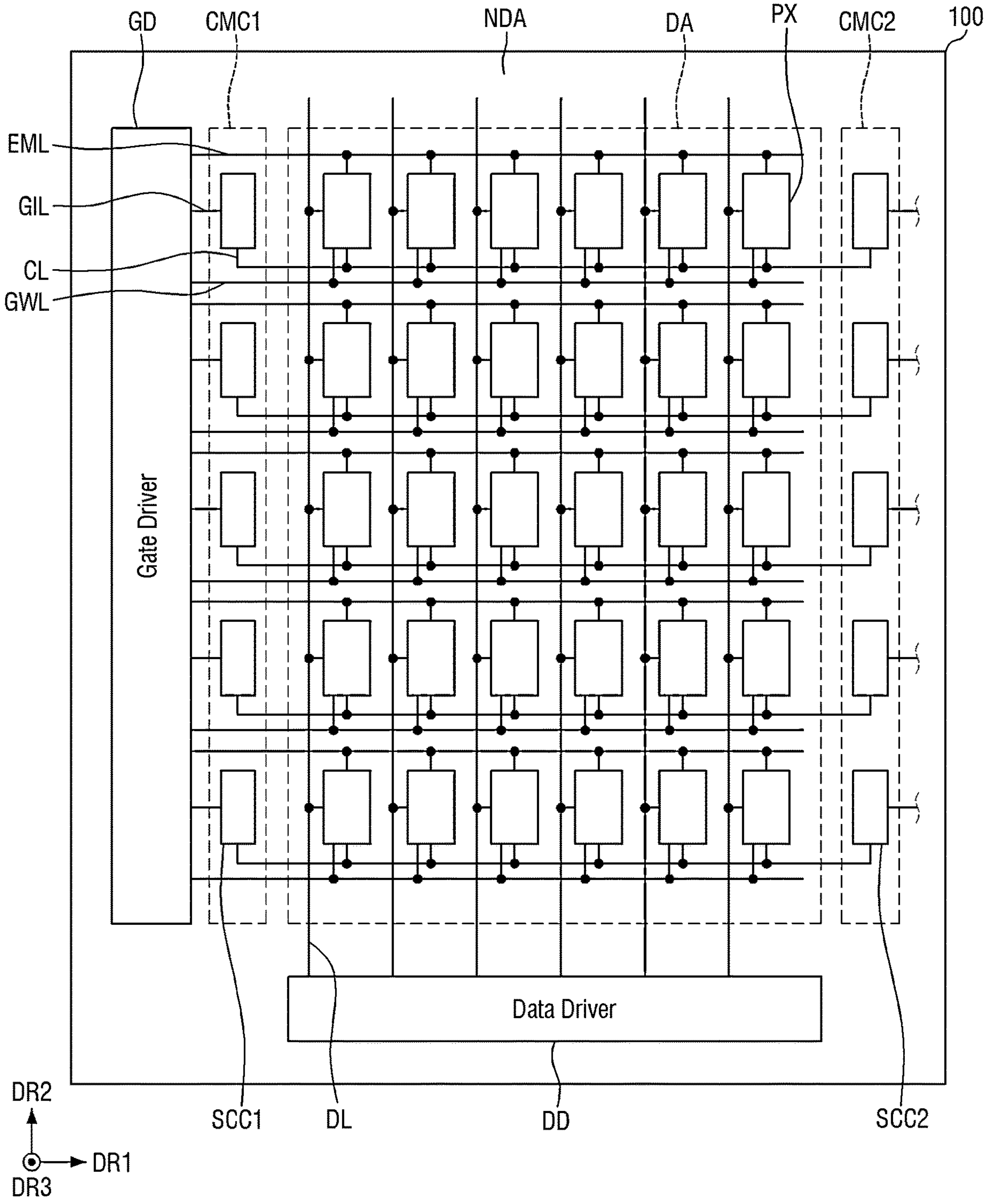
FIG. 11 is a schematic layout view of another example display panel of FIG. 1.

FIG. 11 is a schematic layout view of another example display panel 100 of FIG. 1.

The display panel 100 of FIG. 11 differs from the display panel 100 of FIG. 2 at least in that it includes multiple common circuits (CMC1 and CMC2), and thus will hereinafter be described, focusing mainly on the difference with the display panel 100 of FIG. 2.

Referring to FIG. 11, the display panel 100 may include a first common circuit CMC1, which is disposed on a side of a non-display area NDA, and a second common circuit CMC2, which is disposed on another side of the non-display area NDA.

A side of a common line CL may be connected to the first common circuit CMC1, and the other side of the common line CL may be connected to the second common circuit CMC2.

The first common circuit CMC1 may include multiple first sub-common circuits SCC1. The first sub-common circuits SCC1 may be substantially identical or similar to the sub-common circuits SCC of FIG. 2, and thus, a detailed description thereof will be omitted.

Each of the first sub-common circuits SCC1 may include the initialization transistor Ti of FIG. 3 or 9 or the first and second initialization transistors Ti1 and Ti2 of FIG. 10.

The second common circuit CMC2 may include multiple second sub-common circuits SCC2. The second sub-common circuits SCC2 may also be substantially identical or similar to the sub-common circuits SCC of FIG. 2, and thus, a detailed description thereof will be omitted.

Each of the second sub-common circuits SCC2 may include the initialization transistor Ti of FIG. 3 or 9 or the first and second initialization transistors Ti1 and Ti2 of FIG. 10.

First and second sub-common circuits SCC1 and SCC2 connected to the same common line CL may operate simultaneously. For example, the initialization transistors of first and second sub-common circuits connected to either side of a single common line CL may be turned on substantially simultaneously by the same initialization gate signal GI.

According to the embodiment of FIG. 11, since a common voltage VSS can be applied to both sides of each common line CL, deviations in the common voltage VSS supplied to pixels PX at either end of each horizontal line (for example, pixels PX near first and second common circuits CMC1 and CMC2 for each horizontal line) can be minimized.

The above description is an example of technical features of the disclosure, and those skilled in the art to which the disclosure pertains will be able to make various modifications and variations. Thus, the embodiments of the disclosure described above may be implemented separately or in combination with each other.

The embodiments disclosed in the disclosure are intended not to limit the technical spirit of the disclosure but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
- a display panel having a display area and a non-display area;
- a plurality of pixels disposed in the display area;
- a light-emitting element disposed in each of the plurality of pixels;
- a driving transistor disposed in each of the plurality of pixels and electrically connected to the light-emitting element; and
- a common circuit disposed in the non-display area and electrically connected to a node between the light-emitting element and the driving transistor,
- wherein each of the light-emitting element and the common circuit receives a same voltage.

2. The display device of claim 1, wherein the common circuit is electrically connected to the node through a common line.

3. The display device of claim 1, wherein the common circuit includes an initialization transistor which is electrically connected to the node and receives a common voltage and an initialization gate signal.

4. The display device of claim 3, wherein
- the initialization transistor is electrically connected between the node and a common voltage line which transmits the common voltage, and
- the initialization gate signal is applied to a gate electrode of the initialization transistor.

5. The display device of claim 3, wherein the initialization transistor and the driving transistor are transistors of opposite types.

6. The display device of claim 1, wherein each of the plurality of pixels further includes:

a switching transistor which is electrically connected between a data line and a gate electrode of the driving transistor; and an emission control transistor which is electrically connected between a source electrode of the driving transistor and a driving voltage line that transmits a driving voltage.

7. The display device of claim 6, wherein a write gate signal is input to a gate electrode of the switching transistor, and an emission signal is input to a gate electrode of the emission control transistor.

8. The display device of claim 7, further comprising:

a gate driver transmitting an initialization gate signal to the common circuit and transmitting the write gate signal and the emission signal to each of the plurality of pixels.

9. The display device of claim 8, wherein during an initialization period, each of the emission signal, the write gate signal, and the initialization gate signal has an active level, and a reference voltage is applied to the data line.

10. The display device of claim 9, wherein the write gate signal has a non-active level during part of the initialization period, before an end of the initialization period.

11. The display device of claim 9, wherein during a threshold voltage detection period after the initialization period, the initialization gate signal has the active level, each of the emission signal and the write gate signal has a non-active level, and the reference voltage is applied to the data line.

12. The display device of claim 11, wherein a data voltage is applied to the data line during part of the threshold voltage detection period, before an end of the threshold voltage detection period.

13. The display device of claim 11, wherein during a data write period after the threshold voltage detection period, each of the write gate signal and the initialization gate signal has the active level, the emission signal has the non-active level, and a data voltage is applied to the data line.

14. The display device of claim 13, wherein during part of the data write period, before an end of the data write period, the write gate signal has the non-active level, and the reference voltage is applied to the data line.

15. The display device of claim 13, wherein during an emission period after the data write period, the emission signal has the active level, each of the write gate signal and the initialization gate signal has the non-active level, and the reference voltage is applied to the data line.

16. The display device of claim 15, wherein the initialization gate signal has the active level during part of the emission period, after a beginning of the emission period.

17. The display device of claim 15, wherein the reference voltage, the driving voltage, and a common voltage are direct current (DC) voltages.

18. The display device of claim 17, wherein the reference voltage is greater than the common voltage and smaller than the driving voltage.

19. The display device of claim 6, wherein each of the plurality of pixels further includes:

a first capacitor which is electrically connected between the gate electrode and the source electrode of the driving transistor; and a second capacitor which is electrically connected between the source electrode of the driving transistor and the driving voltage line.

20. The display device of claim 19, wherein a ratio of a capacitance of the second capacitor to a capacitance of the first capacitor is about 2:1.

21. The display device of claim 1, wherein the common circuit includes a plurality of initialization transistors which are electrically connected in series between the node and a common voltage line that transmits a common voltage.

22. The display device of claim 1, wherein the common circuit includes:

a first common circuit which is disposed on a side of the non-display area and is electrically connected to the node; and a second common circuit which is disposed on another side of the non-display area and is electrically connected to the node.

* * * * *